(12) United States Patent
Harada et al.

(10) Patent No.: US 8,372,907 B2
(45) Date of Patent: Feb. 12, 2013

(54) STABILIZER FOR CHLORINE-CONTAINING RESINS AND CHLORINE-CONTAINING RESIN COMPOSITION

(75) Inventors: Masashi Harada, Saitama (JP); Taro Mitsudera, Saitama (JP); Yosuke Ishima, Saitama (JP); Yuki Hayashi, Fukuoka (JP)

(73) Assignee: Adeka Corporation, Tokyo (JP)

( * ) Notice: Subject to any disclaimer, the term of this patent is extended or adjusted under 35 U.S.C. 154(b) by 127 days.

(21) Appl. No.: 12/680,201

(22) PCT Filed: Nov. 17, 2008

(86) PCT No.: PCT/JP2008/070849
§ 371 (c)(1),
(2), (4) Date: Mar. 26, 2010

(87) PCT Pub. No.: WO2009/069491
PCT Pub. Date: Jun. 4, 2009

(65) Prior Publication Data
US 2010/0256278 A1 Oct. 7, 2010

(30) Foreign Application Priority Data

Nov. 28, 2007 (JP) ................................. 2007-307921
Nov. 28, 2007 (JP) ................................. 2007-307922

(51) Int. Cl.
*C05K 5/05* (2006.01)
*C09K 15/06* (2006.01)
(52) U.S. Cl. ....................... 524/387; 252/407
(58) Field of Classification Search .................. 524/387; 252/407
See application file for complete search history.

(56) References Cited

U.S. PATENT DOCUMENTS

| | | | | |
|---|---|---|---|---|
| 3,953,358 A | * | 4/1976 | Sjogreen | 252/407 |
| 5,430,108 A | * | 7/1995 | Schlosberg et al. | 524/311 |
| 5,886,072 A | * | 3/1999 | Linsky et al. | 524/145 |

FOREIGN PATENT DOCUMENTS

| | | |
|---|---|---|
| JP | 53-132052 | 11/1978 |
| JP | 55-116745 | 9/1980 |
| JP | 55-161831 | 12/1980 |
| JP | 56-057844 | 5/1981 |
| JP | 63-202662 | 8/1988 |
| JP | 07-097495 | 4/1995 |
| JP | 7097495 A * | 4/1995 |
| JP | 08-143704 | 6/1996 |
| JP | 09-268286 | 10/1997 |
| JP | 10-007859 | 1/1998 |
| JP | 2003-336064 | 11/2003 |
| WO | 2007/132591 | 11/2007 |

OTHER PUBLICATIONS

International Search Report—PCT/JP2008/070849—Dec. 22, 2008.

* cited by examiner

*Primary Examiner* — Robert D. Harlan
(74) *Attorney, Agent, or Firm* — Young & Thompson

(57) ABSTRACT

A stabilizer for chlorine-containing resins of the invention consists of a polyol mixture composed of pentaerythritol and condensates thereof, wherein, with respect to the total amount of the polyol mixture, the content of pentaerythritol having a degree of condensation (n) of 1 is 0 to 10% by mass and the total content of pentaerythritol and condensates thereof having a degree of condensation (n) of 1 to 3 is 5 to 30% by mass. A chlorine-containing resin composition of the invention contains, with respect to 100 parts by mass of a chlorine-containing resin, 0.01 to 10 parts by mass of the above-mentioned stabilizer for chlorine-containing resins.

20 Claims, No Drawings

US 8,372,907 B2

STABILIZER FOR CHLORINE-CONTAINING RESINS AND CHLORINE-CONTAINING RESIN COMPOSITION

FIELD OF THE INVENTION

The present invention relates to a stabilizer for chlorine-containing resins that is composed of a mixture of pentaerythritol and condensates thereof and that has excellent dispersibility into chlorine-containing resins as well as excellent heat resistance, impact resistance, and plate-out preventability and that also provides excellent outer appearance to a molded product, and also relates to a chlorine-containing resin composition employing the above-mentioned stabilizer for chlorine-containing resins.

The present invention also relates to a vinyl chloride resin composition that contains a zinc-based compound as a stabilizer and that has an improved thermal stability effect.

BACKGROUND OF THE INVENTION

Chlorine-containing resins, and particularly vinyl chloride resins, are known to have a drawback in stability against light and heat and tend to cause decomposition primarily due to dehydrohalogenation upon thermal molding or product use. Various attempts have been made to improve the stability of vinyl chloride resins by mixing various types of stabilizers, such as metal salts of organic acids, organic tin compounds, organic phosphite compounds, epoxy compounds, β-diketone compounds, antioxidants, and UV absorbers.

In recent years, the use of harmful heavy metals such as lead and cadmium, which are toxic from the standpoint of environmental protection, has come to be avoided and restricted. This has aroused a demand for replacement of such substances with nontoxic or low-toxic composite stabilizers, such as barium-zinc-based stabilizers, magnesium-zinc-based stabilizers, calcium-zinc-based stabilizers, and calcium-magnesium-zinc-based stabilizers.

However, in vinyl chloride resin compositions that include zinc-containing composite stabilizers, zinc chloride is produced as thermal decomposition begins, and the zinc chloride acts as a catalyst and advances degradation of the vinyl chloride resin. A method that is known for preventing this action is to use, in combination, a polyol compound to deactivate the zinc chloride through chelation. Examples of such polyol compounds include pentaerythritol and pentaerythritol condensates such as dipentaerythritol and tripentaerythritol.

Pentaerythritol, however, causes sublimation, which may give rise to problems such as contamination of processing devices and damage to the surfaces of products made of the vinyl chloride resin composition. Accordingly, it is necessary to keep the content of pentaerythritol at least equal to or below 10% by mass with respect to the total amount of the mixture of the above-mentioned polyol compounds, and it is preferable to keep the content of pentaerythritol equal to or below 1% by mass with respect to the vinyl chloride resin composition.

Pentaerythritol condensates such as dipentaerythritol and tripentaerythritol are compounds that are good in providing thermal stability to vinyl chloride resin. These compounds, however, have melting points higher than the molding/processing temperature of vinyl chloride resin and also have poor compatibility with vinyl chloride resin, resulting in poor dispersion within the resin. This leads to plate-out and results in problems such as insufficient effect of providing thermal stability and deterioration in transparency of molded products. Accordingly, various attempts have been made heretofore in order to solve these problems caused by poor dispersion.

An example of a method for resolving the above-mentioned poor dispersion is given in Patent Document 1, which discloses fine-grinding of pentaerythritol.

Patent Document 2 discloses a method of melting a mixture of ditrimethylol propane and dipentaerythritol to improve the dispersibility of dipentaerythritol.

Patent Document 3 discloses a partially-esterified compound produced by reacting pentaerythritol and at least one compound selected from a group consisting of monocarboxylic acids, polycarboxylic acids, esters thereof, acid halides thereof, and acid anhydrides thereof. Patent Document 4 discloses ester compounds such as a partially-esterified compound produced by esterification of pentaerythritol and a linear saturated fatty acid.

Patent Document 5 discloses a method of melting and mixing dipentaerythritol and ester compounds of pentaerythritols.

Patent Document 6 discloses a method of producing a stabilizer for vinyl chloride resin through dehydrative condensation reaction by esterification of pentaerythritol and a dibasic acid (or an acid anhydride thereof).

Patent Document 1: JP-A-10-7859
Patent Document 2: JP-A-9-268286
Patent Document 3: JP-A-56-57844
Patent Document 4: JP-A-7-97495
Patent Document 5: JP-A-2003-336064
Patent Document 6: JP-A-8-143704

Excellent properties/characteristics are required of current-day vinyl chloride resins, and there is a demand for further improvement in heat resistance (thermal stability) and in properties such as transparency. Accordingly, the current situation is that vinyl chloride resins containing conventionally-proposed stabilizers are no longer sufficient.

For example, the method disclosed in Patent Document 1 makes it possible to resolve the above-mentioned problem of poor dispersion by pulverizing the pentaerythritol compound to a particle diameter of 35 μm or less. This pulverizing process, however, requires a large amount of energy and thus gives rise to an increase in cost.

As for the method disclosed in Patent Document 2, ditrimethylol propane contained in the mixture of ditrimethylol propane and dipentaerythritol has no effect as a stabilizer. Accordingly, in the mixture of ditrimethylol propane and dipentaerythritol, the number of dipentaerythritol (the hydroxy groups), which is the primary effective component, is reduced, and it is thus necessary to use a large amount of the mixture to attain the desired properties/characteristics. Using a large amount of the mixture, however, gives rise to deterioration in the physical properties of the molded products and also causes plate-out on the surfaces thereof.

The partially-esterified compound produced by reacting pentaerythritol and at least one compound selected from a group consisting of monocarboxylic acids, polycarboxylic acids, esters thereof, acid halides thereof, and acid anhydrides thereof disclosed in Patent Document 3 and the ester compounds such as the partially-esterified compound produced by esterification of pentaerythritol and a linear saturated fatty acid disclosed in Patent Document 4 are inferior in heat resistance compared to pentaerythritol itself, and the number of hydroxy groups therein, which are the primary effective components, is reduced, thus being far from satisfying as a stabilizer.

The mixture produced by melting and mixing dipentaerythritol and ester compounds of pentaerythritols disclosed in Patent Document 5 is reduced in the number of hydroxy groups, which are the effective components as a stabilizer. Further, the molten mixture is taken out from a mold in the form of a large clump, and there is a need for an additional process of pulverizing the clump to a size/shape susceptible of use.

The condensate produced by esterification of pentaerythritol and a dibasic acid (or an acid anhydride thereof) disclosed in Patent Document 6 contains etherified compounds of pentaerythritol and is thus reduced in the number of hydroxy groups, which are the effective components as a stabilizer, thus being far from satisfying.

As described above, the various attempts made heretofore have not been successful in providing a satisfying stabilizer for chlorine-containing resins and a chlorine-containing resin composition using such stabilizer.

SUMMARY OF THE INVENTION

Accordingly, a first object of the present invention is to provide a stabilizer for chlorine-containing resins that has good dispersibility in chlorine-containing resins and that has a sufficient effect of providing stability thereto.

A second object of the present invention is to provide a vinyl chloride resin composition containing a calcium/zinc-based stabilizer and having excellent heat resistance, transparency, and outer appearance.

Inventors have found that the above-mentioned first object can be achieved by mixing pentaerythritol and pentaerythritol condensates at a specific rate in a mixture composed thereof, thus arriving at the present invention.

Inventors have also found that the above-mentioned second object can be achieved by mixing pentaerythritol and condensates thereof to vinyl chloride resin at a specific rate, thus arriving at the present invention.

That is, the present invention (also referred to hereinafter as "first invention") provides a stabilizer for chlorine-containing resins that consists of a polyol mixture composed of pentaerythritol and condensates thereof, wherein, with respect to the total amount of the polyol mixture, the content of pentaerythritol having a degree of condensation (n) of 1 is 0 to 10% by mass and the total content of pentaerythritol and condensates thereof having a degree of condensation (n) of 1 to 3 is 5 to 30% by mass.

Further, the present invention (also referred to hereinafter as "second invention") provides a chlorine-containing resin composition containing, with respect to 100 parts by mass of a chlorine-containing resin, 0.01 to 10 parts by mass of the above-mentioned stabilizer for chlorine-containing resins.

Furthermore, the present invention (also referred to hereinafter as "third invention") provides a vinyl chloride resin composition containing, with respect to 100 parts by mass of vinyl chloride resin, 0.1 to 20 parts by mass of a calcium/zinc-based stabilizer and 0.01 to 10 parts by mass of a polyol compound, wherein the polyol compound is a polyol mixture composed of pentaerythritol and condensates thereof, wherein, with respect to the total amount of the polyol mixture, the total content of pentaerythritol and condensates thereof having a degree of condensation (n) of 1 to 3 is 5 to 40% by mass.

DETAILED DESCRIPTION OF THE INVENTION

The present invention will be described in detail below according to preferred embodiments thereof.

First, the stabilizer for chlorine-containing resins according to the first invention will be described.

The stabilizer for chlorine-containing resins according to the first invention consists of a polyol mixture composed of pentaerythritol and condensates thereof, wherein, with respect to the total amount of the polyol mixture, the content of pentaerythritol having a degree of condensation (n) of 1 is 0 to 10% by mass and the total content of pentaerythritol and condensates thereof having a degree of condensation (n) of 1 to 3 is 5 to 30% by mass (wherein the sum of the content of pentaerythritol and condensates thereof having a degree of condensation (n) of 1 to 3 and the content of condensates of pentaerythritol having a degree of condensation (n) of 4 or above is 100% by mass).

In the polyol mixture, it is preferable that, with respect to the total amount of the polyol mixture, the content of pentaerythritol having a degree of condensation (n) of 1 is 0 to 5% by mass and the total content of pentaerythritol and condensates thereof having a degree of condensation (n) of 1 to 3 is 10 to 30% by mass, and it is even more preferable that pentaerythritol having a degree of condensation (n) of 1 is not contained at all. A content of pentaerythritol having a degree of condensation (n) of 1 higher than 10% by mass may cause plate-out and is thus not preferable. A total content of pentaerythritol and condensates thereof having a degree of condensation (n) of 1 to 3 higher than 30% by mass is not preferable because it may cause plate-out, whereas a total content thereof lower than 5% by mass is also not preferable because the effect of providing thermal stability to chlorine-containing resins may become insufficient.

An example of the condensates of pentaerythritol includes compound(s) shown in General Formula (1) below.

[Formula 1]

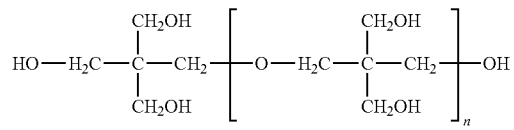

(In the formula, "n" is an integer of 0, or 1 or above.)

The polyol mixture may include, for example, compounds resulting from intramolecular etherification within a single condensate of pentaerythritol shown in General Formula (1) above, compounds resulting from the intermediate methylol group(s) forming ether bond(s) with other molecule(s), compounds that have linked together into a mesh-like form, and large-size compounds formed by further linkage among molecules, forming macrocyclic ether structures in various portions.

The condensates of pentaerythritol can be produced according to known methods without limitation. For example, the condensates of pentaerythritol can be produced through thermal dehydrative condensation reaction of pentaerythritol and/or condensates of pentaerythritol as they are or in the presence of an appropriate catalyst and solvent.

Examples of the above-mentioned catalyst include inorganic acids and organic acids that are generally used for dehydrative condensation reaction of alcohols. Examples of inorganic acids include mineral acids such as phosphoric acid and sulfuric acid; acidic salts of such mineral acids; and solid acid catalysts such as clay minerals (e.g. montmorillonite), silica.alumina, and zeolite. Examples of organic acids include formic acid and para-toluenesulfonic acid.

There is no particular limitation to the amount of catalyst to be used. In cases of using a water-soluble acid catalyst, it will suffice if the amount used can keep the pH of the reaction system during reaction below 7, and preferably equal to or below 5. In cases of using a solid acid catalyst, it will generally suffice if the amount used is 0.1 to 100% by mass with respect to pentaerythritol.

Examples of the above-mentioned solvent include: hydrocarbons such as benzene, xylene, decalin, and tetralin; ethers such as dioxane, tetrahydrofuran, ethyl ether, anisole, phenyl ether, diglyme, tetraglyme, and 18-crown-6; esters such as methyl acetate, ethyl butyrate, methyl benzoate, and γ-butyrolactone; N-substituted amides such as N-methylpyrrolidinone, N,N-dimethylacetamide, N-methylpiperidone, and hexamethylphosphoric triamide; tertiary amines such as N,N-diethylaniline, N-methylmorpholine, pyridine, and quinoline; sulfones such as sulfolane; sulfoxides such as dimethylsulfoxide; urea derivatives such as 1,3-dimethyl-2-imidazolidinone; phosphine oxides such as tributylphosphine oxide; and silicone oil. These solvents may be dehydrated or may be hydrous.

The temperature range for the thermal dehydrative condensation reaction is generally around 100 to 280° C., and more preferably 150 to 240° C. Temperatures below 100° C. result in slow reaction, whereas temperatures above 280° C. make the condensation reaction difficult to control, thus not preferable.

Next, the chlorine-containing resin composition according to the second invention will be described.

The chlorine-containing resin composition of the second invention contains, with respect to 100 parts by mass of a chlorine-containing resin, 0.01 parts by mass to 10 parts by mass, preferably 0.05 to 5 parts by mass, and more preferably 0.1 to 3 parts by mass, of the stabilizer for chlorine-containing resins according to the first invention. An amount smaller than 0.01 parts by mass makes the effect of adding the stabilizer insufficient, whereas an amount of more than 10 parts by mass may cause plate-out on the surfaces of molded products obtained by molding/processing the chlorine-containing resin composition.

There is no particular limitation to the method for polymerizing the chlorine-containing resin used for the chlorine-containing resin composition of the second invention, and methods such as polymerization in bulk, polymerization in solution, suspension polymerization, or emulsion polymerization may be employed. The degree of polymerization and the particle diameter of the chlorine-containing resin are also not limited. Examples of the above-mentioned chlorine-containing resin include: chlorine-containing resins such as polyvinyl chloride, chlorinated polyvinyl chloride, polyvinylidene chloride, chlorinated polyethylene, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-maleate copolymer, vinyl chloride-methacrylate copolymer, vinyl chloride-acrylonitrile copolymer, and copolymers of vinyl chloride and various vinyl ethers; blends of the above-mentioned resins; blends of the above-mentioned chlorine-containing resin(s) and other synthetic resins that do not contain chlorine, such as acrylonitrile-styrene copolymer, ethylene-vinyl acetate copolymer, ethylene-ethyl(meth)acrylate copolymer, polyesters, polyolefins, polyamides, and polycarbonates; and alloys of the above.

It is preferable to further add at least one type of β-diketone compound to the chlorine-containing resin composition of the second invention because it is possible to suppress staining of products due to molding/processing.

Examples of the above-mentioned β-diketone compound include acetylacetone, triacetylmethane, 2,4,6-heptatrione, butanoylacetylmethane, lauroylacetylmethane, palmitoylacetylmethane, stearoylbenzoylmethane, stearoylacetylmethane, phenylacetylacetylmethane, dicyclohexylcarbonylmethane, benzoylformylmethane, benzoylacetylmethane, dibenzoylmethane, octylbenzoylmethane, bis(4-octylbenzoyl)methane, benzoyldiacetylmethane, 4-methoxybenzoylbenzoylmethane, bis(4-carboxymethylbenzoyl)methane, 2-carboxymethylbenzoylacetyloctylmethane, dehydroacetic acid, ethyl acetoacetate, cyclohexan-1,3-dione, 3,6-dimethyl-2,4-dioxycyclohexane-1-carboxylic acid methyl ester, 2-acetylcyclohexanone, dimedone, and 2-benzoylcyclohexane. Metal salts of these compounds may be used. Examples of metal species capable of providing such metals salts of the β-diketone compound include: Group IA metals such as lithium, sodium, and potassium; Group IIA metals such as magnesium, calcium, strontium, and barium; zinc, aluminum, tin, and alkyltin.

Among these β-diketone compounds, the use of dibenzoylmethane, stearoylbenzoylmethane, acetylacetone metal salt, or calcium acetylacetonate is preferred because less-stained products can be obtained.

The amount of the above-mentioned β-diketone compound to be used is preferably 0.001 to 10 parts by mass, and more preferably 0.05 to 5 parts by mass, with respect to 100 parts by mass of the chlorine-containing resin.

It is also preferable to add at least one type of hydrotalcite compound to the chlorine-containing resin composition of the second invention because it is possible to improve heat resistance.

Examples of the above-mentioned hydrotalcite compound that may preferably be used include double salt compounds composed of magnesium and aluminum, or zinc, magnesium, and aluminum. Further, the water of crystallization in the hydrotalcite compound may be dehydrated. The hydrotalcite compound may be a naturally-occurring product or a synthetic product, and various hydrotalcite compounds may be used regardless of the crystal structure, the crystal grain size, etc. Further, the surface of the hydrotalcite compound may be covered with, for example, a higher fatty acid such as stearic acid, a higher fatty acid metal salt such as an alkali metal salt of oleic acid, an organic sulfonic acid metal salt such as an alkali metal salt of dodecylbenzenesulfonic acid, a higher fatty acid amide, a higher fatty acid ester, or a wax.

Commercially-available products may be used for the hydrotalcite compound. Examples of commercially-available products include ALCAMIZER 1, ALCAMIZER 2, ALCAMIZER P93, ALCAMIZER 5, ALCAMIZER 7, and DHT-4A (all products of Kyowa Chemical Industry Co., Ltd.). Among these, ALCAMIZER 1 and DHT-4A can be used preferably.

The amount of hydrotalcite compound used is preferably 0.001 to 10 parts by mass, and more preferably 0.01 to 5 parts by mass, with respect to 100 parts by mass of the chlorine-containing resin. An amount of hydrotalcite compound smaller than 0.001 parts by mass will hardly achieve any effect of adding the hydrotalcite compound, whereas an amount of more than 10 parts by mass will not increase the effectiveness but may instead cause discoloration after molding or foaming during processing.

It is also preferable to mix at least one type of a zinc salt of an organic acid to the chlorine-containing resin composition of the second invention because it is possible to obtain products that are excellent in stain resistance.

Examples of such an organic-acid zinc salt include zinc salts of carboxylic acids, organic phosphoric acids, and phenols. Examples of the above-mentioned carboxylic acids include caproic acid, caprylic acid, pelargonic acid, 2-ethylhexanoic acid, capric acid, neodecanoic acid, undecylenic acid, lauric acid, myristic acid, palmitic acid, stearic acid, isostearic acid, 12-hydroxystearic acid, chlorostearic acid, 12-ketostearic acid, phenylstearic acid, ricinoleic acid, linoleic acid, linolenic acid, oleic acid, arachic acid, behenic acid, erucic acid, brassidic acid, and similar acids; mixtures of naturally-occurring acids such as tallow fatty acid, coconut oil fatty acid, Chinese wood oil fatty acid, soybean oil fatty acid, and cottonseed oil fatty acid; benzoic acid, p-tert-butylbenzoic acid, ethylbenzoic acid, isopropylbenzoic acid, toluic acid, xylic acid, salicylic acid, 5-tert-octylsalicylic acid, naphthenic acid, and cyclohexane carboxylic acid. Examples of the above-mentioned organic phosphoric acids include mono- or di-octylphosphoric acid, mono- or di-dodecylphosphoric acid, mono- or di-octadecylphosphoric acid, mono- or di-(nonylphenyl)phosphoric acid, phosphonic acid nonylphenyl ester, and phosphonic acid stearyl ester. Examples of the above-mentioned phenols include phenol, cresol, ethylphenol, cyclohexylphenol, nonylphenol, and dodecylphenol. The organic-acid zinc salt may be, for example, a normal salt, an acidic salt, a basic salt, or an overbased salt.

The amount of organic-acid zinc salt used is preferably 0.001 to 10 parts by mass, and more preferably 0.05 to 5 parts by mass, with respect to 100 parts by mass of the chlorine-containing resin.

In the chlorine-containing resin composition of the second invention, it is also possible to use metal salts of organic acids other than the organic-acid zinc salts. Examples of such metal salts of organic acids include metal salts (e.g., Li, Na, K, Ca, Mg, Ba, Sr, Cd, or Al) of carboxylic acids, organic phosphoric acids, and phenols. Examples of the carboxylic acids, organic phosphoric acids, and phenols include those listed as examples for the above-mentioned organic-acid zinc salts. The organic-acid metal salt may be, for example, a normal salt, an acidic salt, a basic salt, or an overbased salt. Among these organic-acid metal salts, the use of organic-acid salts of non-heavy metals (Li, Na, K, Ca, Mg, or Al) is preferred because low-toxic compositions can be obtained. In particular, combined use of a calcium salt of an organic acid and the above-mentioned organic-acid zinc salt is preferable because it is possible to obtain compositions that are further improved in properties such as heat resistance and stain resistance while having low toxicity.

The amount of organic-acid metal salt used is preferably 0.001 to 10 parts by mass, and more preferably 0.05 to 5 parts by mass, with respect to 100 parts by mass of the chlorine-containing resin.

The chlorine-containing resin composition of the second invention may also contain, as necessary, generally-used additives such as organic phosphite compounds, phenol-based or sulfur-based antioxidants, plasticizers, epoxy compounds, UV absorbers, hindered amine-based light stabilizers, foaming agents, fillers, and polyol compounds.

Examples of the above-mentioned organic phosphite compounds include triphenyl phosphite, tris(2,4-di-tert-butylphenyl)phosphite, tris(nonylphenyl)phosphite, tris(dinonylphenyl)phosphite, tris(mono- and di-nonylphenyl)phosphite, diphenyl acid phosphite, 2,2'-methylene-bis(4,6-di-tert-butylphenyl)octyl phosphite, diphenyl decyl phosphite, phenyl diisodecyl phosphite, tributyl phosphite, tri(2-ethylhexyl) phosphite, tridecyl phosphite, trilauryl phosphite, dibutyl acid phosphite, dilauryl acid phosphite, trilauryl trithio phosphite, bis(neopentyl glycol)-1,4-cyclohexane dimethyl diphosphite, bis(2,4-di-tert-butylphenyl)pentaerythritol diphosphite, bis(2,6-di-tert-butyl-4-methylphenyl)pentaerythritol diphosphite, distearyl pentaerythritol diphosphite, phenyl-4,4'-isopropylidene diphenol-pentaerythritol diphosphite, tetra(C12 to C15 mixed alkyl)-4,4-isopropylidene diphenyl diphosphite, hydrogenated 4,4'-isopropylidene diphenol polyphosphite, bis(octylphenyl)-bis[4,4'-n-butylidene bis(2-tert-butyl-5-methylphenol)]-1,6-hexanediol diphosphite, tetratridecyl-4,4'-butylidene bis(2-tert-butyl-5-methylphenol)diphosphite, hexa(tridecyl)-1,1,3-tris(2-methyl-5-tert-butyl-4-hydroxyphenyl)butane triphosphite, 9,10-dihydro-9-oxa-10-phosphaphenanthrene 10-oxide, and 2-butyl-2-ethylpropanediol-2,4,6-tri-tert-butylphenol monophosphite.

Examples of the above-mentioned phenol-based antioxidants include 2,6-di-tert-butyl-p-cresol, 2,6-diphenyl-4-octadesiloxyphenol, stearyl(3,5-di-tert-butyl-4-hydroxyphenyl) propionate, distearyl(3,5-di-tert-butyl-4-hydroxybenzyl) phosphonate, thiodiethylene-bis[(3,5-di-tert-butyl-4-hydroxyphenyl)propionate], 4,4'-thio-bis(6-tert-butyl-m-cresol), 2-octylthio-4,6-di(3,5-di-tert-butyl-4-hydroxyphenoxy)-s-triazine, 2,2'-methylene-bis(4-methyl-6-tert-butylphenol), bis[3,3-bis(4-hydroxy-3-tert-butylphenyl)butyric acid]glycol ester, 4,4'-butylidene bis(6-tert-butyl-m-cresol), 2,2'-ethylidene bis(4,6-di-tert-butylphenol), 1,1,3-tris(2-methyl-4-hydroxy-5-tert-butylphenyl)butane, bis[2-tert-butyl-4-methyl-6-(2-hydroxy-3-tert-butyl-5-methylbenzyl)phenyl]terephthalate, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 1,3,5-tris[(3,5-di-tert-butyl-4-hydroxyphenyl)propionyloxyethyl]isocyanurate, tetrakis [methylene-3-(3,5-di-tert-butyl-4-hydroxyphenyl) propionate]methane, 2-tert-butyl-4-methyl-6-(2-acryloyloxy-3-tert-butyl-5-methylbenzyl)phenol, 3,9-bis[1,1-dimethyl-2-hydroxyethyl]-2,4,8,10-tetraoxaspiro[5,5] undecane-bis[β-(3-tert-butyl-4-hydroxy-5-butylphenyl) propionate], and triethylene glycol bis[β-(3-tert-butyl-4-hydroxy-5-methylphenyl)propionate].

Examples of the above-mentioned sulfur-based antioxidants include dialkyl thiodipropionates such as dilauryl, dimyristyl, myristyl stearyl, and distearyl esters of thiodipropionic acid, and β-alkylmercaptopropionic acid esters of polyols such as pentaerythritol tetra(β-dodecylmercaptopropionate).

Examples of the above-mentioned plasticizers include: phthalate-based plasticizers such as diheptyl phthalate, dioctyl phthalate, and diisononyl phthalate; adipate-based plasticizers such as dioctyl adipate, diisononyl adipate, and di(butyldiglycol) adipate; phosphate-based plasticizers such as tricresyl phosphate; polyester-based plasticizers; chlorinated paraffin-based plasticizers; trimellitate-based plasticizers; pyromellitate-based plasticizers; and biphenyltetracarboxylate-based plasticizers.

Examples of the above-mentioned epoxy compounds include epoxidized animal and vegetable oils, such as epoxidized soybean oil, epoxidized linseed oil, epoxidized Chinese wood oil, epoxidized fish oil, epoxidized beef tallow oil, epoxidized castor oil, and epoxidized safflower oil, epoxidized methyl stearate, epoxidized polybutadiene, tris(epoxy propyl)isocyanurate, epoxidized tall oil fatty ester, epoxidized linseed oil fatty ester, bisphenol A diglycidyl ether, vinylcyclohexene diepoxide, dicyclohexene diepoxide, and 3,4-epoxy cyclohexyl methyl-epoxy cyclohexane carboxylate. Note that in cases of using epoxy compounds that can also be used as plasticizers, such as epoxidized soybean oil, the total amount of epoxy compound and plasticizer used should not exceed 25 parts by mass with respect to 100 parts by mass of the chlorine-containing resin in order to prevent deterioration in rigidity.

Examples of the above-mentioned UV absorbers include: 2-hydroxybenzophenones such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone); 2-(2-hydroxyphenyl) benzotriazoles such as 2-(2-hydroxy-5-methylphenyl) benzotriazole, 2-(2-hydroxy-5-tert-octylphenyl) benzotriazole, 2-(2-hydroxy-3,5-di-tert-butylphenyl)-5-chlorobenzotriazole, 2-(2-hydroxy-3-tert-butyl-5-methylphenyl)-5-chlorobenzotriazole, 2-(2-hydroxy-3,5-dicumylphenyl)benzotriazole, 2,2'-methylene-bis(4-tert-octyl-6-benzotriazolyl)phenol, and a polyethylene glycol ester of 2-(2-hydroxy-3-tert-butyl-5-carboxyphenyl)benzotriazole; benzoates such as phenyl salicylate, resorcinol monobenzoate, 2,4-di-tert-butylphenyl-3,5-di-tert-butyl-4-hydroxybenzoate, and hexadecyl-3,5-di-tert-butyl-4-hydroxybenzoate; substituted oxanilides such as 2-ethyl-2'-ethoxyoxanilide and 2-ethoxy-4'-dodecyloxanilide; and cyanoacrylates such as ethyl-α-cyano-β,β-diphenylacrylate and methyl-2-cyano-3-methyl-3-(p-methoxyphenyl)acrylate.

Examples of the above-mentioned hindered amine-based light stabilizers include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis (1,2,2,6,6-pentamethyl-4-piperidyl)sebacate, tetrakis(2,2,6,6-tetramethyl-4-piperidyl)butane tetracarboxylate, tetrakis (1,2,2,6,6-pentamethyl-4-piperidyl)butane tetracarboxylate, bis(1,2,2,6,6-pentamethyl-4-piperidyl)-di(tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetraethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino) hexane/2,4-dichloro-6-tert-octylamino-s-triazine polycondensate, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8, 12-tetraazadodecane, 1,6,11-tris[2,4-bis(N-butyl-N-(2,2,6, 6-tetramethyl-4-piperidyl)amino)-s-triazin-6-ylamino] undecane, and 1,6,11-tris[2,4-bis(N-butyl-N-(1,2,2,6,6-pentamethyl-4-piperidyl)amino)-s-triazin-6-ylamino] undecane.

Examples of the above-mentioned foaming agents include: azo-based foaming agents such as azodicarbonamide, azobisisobutylnitrile, diazoaminobenzene, diethylazodicarboxylate, diisopropylazodicarboxylate, and azobis(hexahydrobenzonitrile); nitroso-based foaming agents such as N,N'-dinitropentamethylenetetramine and N,N'-dimethyl-N,N'-dinitroterephthalamine; hydrazide-based foaming agents such as benzene sulfonylhydrazide, p-toluene sulfonylhydrazide, 3,3'-disulfone hydrazide phenylsulfone, toluene disulfonyl hydrazone, thiobis(benzene sulfonylhydrazide), toluene sulfonylazide, toluene sulfonylsemicarbazide, and p,p'-bis(benzene sulfonylhydrazide) ether; carbazide-based foaming agents such as p-toluene sulfonylsemicarbazide and 4,4'-oxy-bis(sulfonylsemicarbazide); and triazine-based foaming agents such as trihydrazinotriazine and 1,3-bis(o-biphenyltriazine).

Examples of the above-mentioned fillers include calcium carbonate, calcium oxide, calcium hydroxide, zinc oxide, zinc hydroxide, zinc carbonate, zinc sulfide, magnesium oxide, magnesium hydroxide, magnesium carbonate, aluminum oxide, aluminum hydroxide, sodium aluminosilicate, hydrotalcite, hydrocalumite, aluminum silicate, magnesium silicate, calcium silicate, zeolite, activated clay, talc, clay, colcothar, asbestos, and antimony trioxide.

As for the above-mentioned polyol compounds, it is possible to use condensates of the above-mentioned pentaerythritol compounds as well as other polyol compounds. Examples of other polyol compounds include: low molecular-weight polyol compounds such as ethylene glycol, diethylene glycol, triethylene glycol, 1,2-propanediol, 1,3-propanediol, 1,2-butanediol, 1,3-butanediol, 1,4-butanediol, 1,6-hexanediol, hydrogenated bisphenol A, glycerol, trimethylol propane, 1,2,6-hexanetriol, diglycerol, dextrose, sorbitol, and sucrose; and polyol compounds obtained by adding alkylene oxide to the above-mentioned low molecular-weight polyol compound.

Further, other stabilizers may be added to the chlorine-containing resin composition of the second invention. Examples of such stabilizers include diphenylthiourea, anilinodithiotriazine, melamine, benzoic acid, cinnamic acid, p-tert-butylbenzoic acid, zeolite, and perchlorates.

Furthermore, other agents, such as cross-linking agents, antistatic agents, antifogging agents, anti-plate-out agents, surface-treating agents, slip additives, flame retardants, antifogging agents, fluorescers, fungicides, bactericides, metal deactivators, mold-release agents, pigments, and processing aids, may be mixed as necessary to the chlorine-containing resin composition of the second invention.

The amount of the various additives to use may be selected as appropriate depending on the use, etc., and it is preferable that the total amount thereof is 100 parts by mass or less with respect to 100 parts by mass of the chlorine-containing resin.

The chlorine-containing resin composition of the second invention can be used without being limited in how it is processed. For example, the chlorine-containing resin composition can suitably be used with calendering, rolling, extrusion, injection molding, melt casting, pressurized molding, and powder molding.

The chlorine-containing resin composition of the second invention can suitably be used for various materials such as: construction materials such as wall materials, floor materials, window frames, and wallpapers; interior materials for automobiles; covering materials for electric wires; agricultural materials; food packing materials; coatings; and materials for hoses, pipes, sheets, toys, etc.

Next, the vinyl chloride resin composition according to the third invention will be described below. Note that the detailed explanations given above for the first and second inventions are applied as appropriate to features of the third invention that are not particularly explained below.

The polyol compound used in the vinyl chloride resin composition of the third invention is a polyol mixture composed of pentaerythritol and condensates thereof, wherein, with respect to the total amount of the polyol mixture, the total content of pentaerythritol and condensates thereof having a degree of condensation (n) of 1 to 3 is 5 to 40% by mass (wherein the sum of the content of pentaerythritol and condensates thereof having a degree of condensation (n) of 1 to 3 and the content of condensates of pentaerythritol having a degree of condensation (n) of 4 or above is 100% by mass).

In the polyol mixture, it is preferable that, with respect to the total amount of the polyol mixture, the total content of pentaerythritol and condensates thereof having a degree of condensation (n) of 1 to 3 is 10 to 30% by mass. A total content of pentaerythritol and condensates thereof having a degree of condensation (n) of 1 to 3 higher than 40% by mass is not preferable because it may cause plate-out, and a total content thereof lower than 5% by mass is also not preferable because the heat resistance of the vinyl chloride resin composition becomes poor.

Focusing on the content of pentaerythritol having a degree of condensation (n) of 1 in the polyol mixture, it is preferable that, with respect to the total amount of the polyol mixture, the content of pentaerythritol having a degree of condensation (n) of 1 is 0 to 10% by mass and the total content of pentaerythritol and condensates thereof having a degree of condensation (n) of 1 to 3 is 5 to 30% by mass, and it is more preferable that, with respect to the total amount of the polyol mixture, the content of pentaerythritol having a degree of condensation (n) of 1 is 0 to 5% by mass and the total content of pentaerythritol and condensates thereof having a degree of condensation (n) of 1 to 3 is 10 to 30% by mass.

An example of the pentaerythritol condensates includes compound(s) shown by the above-mentioned General Formula (1), as with the second invention.

As with the second invention, the polyol mixture may include, for example, compounds resulting from intramolecular etherification within a single condensate of pentaerythritol shown in General Formula (1) above, compounds resulting from the intermediate methylol group(s) forming ether bond(s) with other molecule(s), compounds that have linked together into a mesh-like form, and large-size compounds formed by further linkage among molecules, forming macrocyclic ether structures in various portions.

The condensates of pentaerythritol can be produced in the same way as the condensates of pentaerythritol of the second invention. The detailed explanations given for the second invention are applied as appropriate to the catalysts, solvents, and reaction conditions that are to be used.

The vinyl chloride resin composition of the third invention contains, with respect to 100 parts by mass of vinyl chloride resin, 0.01 parts by mass to 10 parts by mass, preferably 0.05 to 5 parts by mass, and more preferably 0.1 to 3 parts by mass, of the polyol compound. An amount smaller than 0.01 parts by mass makes the effect of adding the polyol compound insufficient, whereas an amount of more than 10 parts by mass may cause plate-out on the surfaces of molded products obtained by molding/processing the vinyl chloride resin composition.

The calcium/zinc-based stabilizer used in the vinyl chloride resin composition of the third invention is a mixture containing a zinc compound and a calcium compound. The mass ratio between the zinc compound and the calcium compound contained in the calcium/zinc-based stabilizer is not particularly limited, but it is preferably 50:1 to 1:10, and more preferably 10:1 to 1:2.

Examples of the above-mentioned zinc compound include: inorganic compounds such as zinc oxide, zinc hydroxide, zinc carbonate, basic zinc carbonate, zinc (meta)borate, zinc (meta)silicate, zinc phosphate or phosphite, zinc aluminate, zinc titanate, zinc stannate, and zinc rhodanate; zinc compounds such as metallic soaps of a monocarboxylic acid or a polycarboxylic acid; and zinc salts of a β-diketone. Examples of the above-mentioned calcium compound include compounds similar to the above-mentioned zinc compounds with the zinc in the metal salt of the zinc compound changed to calcium.

Examples of the above-mentioned monocarboxylic acid include acetic acid, butyric acid, valeric acid, caproic acid, enanthic acid, caprylic acid, pelargonic acid, capric acid, lauric acid, myristic acid, pentadecylic acid, palmitic acid, palmitoleic acid, margaric acid, stearic acid, isostearic acid, 12-hydroxystearic acid, oleic acid, vaccenic acid, linoleic acid, linolenic acid, eleostearic acid, tuberculostearic acid, arachidic acid, behenic acid, lignoceric acid, octylic acid, ricinoleic acid, benzoic acid, para-tert-butylbenzoic acid, chlorobenzoic acid, salicylic acid, acrylic acid, and methacrylic acid.

Examples of the above-mentioned polycarboxylic acid include malonic acid, succinic acid, maleic acid, adipic acid, glutaric acid, itaconic acid, malic acid, tartaric acid, citric acid, phthalic acid, isophthalic acid, terephthalic acid, trimellitic acid, and pyromellitic acid.

Metal salts of monocarboxylic acids are preferred as the zinc compound and the calcium compound in the vinyl chloride resin composition of the third invention, and particularly, metal salts of monocarboxylic acids having a number of carbon atoms of 12 or more, such as lauric acid, oleic acid, myristic acid, stearic acid, and 12-hydroxystearic acid, are preferably used.

The vinyl chloride resin composition of the third invention contains, with respect to 100 parts by mass of the vinyl chloride resin, 0.1 parts by mass to 20 parts by mass, preferably 0.5 to 10 parts by mass, and more preferably 1 to 7 parts by mass, of the calcium/zinc-based stabilizer. An amount smaller than 0.1 parts by mass makes the effect of adding the calcium/zinc-based stabilizer insufficient, whereas an amount of more than 20 parts by mass hardly improves the effectiveness even though the amount is increased and is thus economically unfavorable.

As with the chlorine-containing resin of the second invention, there is no particular limitation to the method for polymerizing the vinyl chloride resin used in the vinyl chloride resin composition of the third invention, and methods such as polymerization in bulk, polymerization in solution, suspension polymerization, or emulsion polymerization may be employed. The degree of polymerization and the particle diameter of the vinyl chloride resin are also not limited.

Examples of the vinyl chloride resin include those compounds given as examples of the chlorine-containing resin used in the chlorine-containing resin composition of the second invention.

It is preferable to further add at least one type of β-diketone compound to the vinyl chloride resin composition of the third invention because it is possible to suppress staining of products due to molding/processing.

Examples of the β-diketone compound include those compounds given as examples of the β-diketone compound used in the chlorine-containing resin composition of the second invention.

Among those β-diketone compounds, the use of dibenzoylmethane, stearoylbenzoylmethane, acetylacetone metal salt, or calcium acetylacetonate is preferred because less-stained products can be obtained.

The amount of the above-mentioned β-diketone compound to be used is preferably 0.001 to 10 parts by mass, and more preferably 0.05 to 5 parts by mass, with respect to 100 parts by mass of the vinyl chloride resin.

It is also preferable to add at least one type of hydrotalcite compound to the vinyl chloride resin composition of the third invention because it is possible to improve heat resistance.

As with the hydrotalcite compound used in the chlorine-containing resin composition of the second invention, examples of the hydrotalcite compound that may preferably be used include double salt compounds composed of magnesium and aluminum, or zinc, magnesium, and aluminum. Further, the water of crystallization in the hydrotalcite compound may be dehydrated. The hydrotalcite compound may be a naturally-occurring product or a synthetic product, and various hydrotalcite compounds may be used regardless of the crystal structure, the crystal grain size, etc. Further, the surface of the hydrotalcite compound may be covered with, for example, a higher fatty acid such as stearic acid, a higher fatty acid metal salt such as an alkali metal salt of oleic acid, an organic sulfonic acid metal salt such as an alkali metal salt of dodecylbenzenesulfonic acid, a higher fatty acid amide, a higher fatty acid ester, or a wax.

Examples of the hydrotalcite compound include those compounds given as examples of commercially-available products used for the hydrotalcite compound in the chlorine-containing resin composition of the second invention. Among them, ALCAMIZER 1 and DHT-4A can be used preferably.

The amount of hydrotalcite compound used is preferably 0.001 to 10 parts by mass, and more preferably 0.01 to 5 parts by mass, with respect to 100 parts by mass of the vinyl chloride resin. An amount of hydrotalcite compound smaller than 0.001 parts by mass will hardly achieve any effect of adding the hydrotalcite compound, whereas an amount of more than 10 parts by mass will not increase the effectiveness but may instead cause discoloration after molding or foaming during processing.

It is also preferable to mix at least one type of a zinc salt of an organic acid to the vinyl chloride resin composition of the third invention because it is possible to obtain products that are excellent in stain resistance.

Examples of the organic-acid zinc salt include those compounds given as examples of the organic-acid zinc salt used in the chlorine-containing resin composition of the second invention. Note that the organic-acid zinc salt may be, for example, a normal salt, an acidic salt, a basic salt, or an overbased salt.

The amount of organic-acid zinc salt used is preferably 0.001 to 10 parts by mass, and more preferably 0.05 to 5 parts by mass, with respect to 100 parts by mass of the vinyl chloride resin.

In the vinyl chloride resin composition of the third invention, it is also possible to use metal salts of organic acids other than the organic-acid zinc salts. As in the second invention, examples of such metal salts of organic acids include metal salts (e.g., Li, Na, K, Ca, Mg, Ba, Sr, Cd, or Al) of carboxylic acids, organic phosphoric acids, and phenols. Examples of the carboxylic acids, organic phosphoric acids, and phenols include those listed as examples for the above-mentioned organic-acid zinc salts. The organic-acid metal salt may be, for example, a normal salt, an acidic salt, a basic salt, or an overbased salt. Among these organic-acid metal salts, the use of organic-acid salts of non-heavy metals (Li, Na, K, Ca, Mg, or Al) is preferred because low-toxic compositions can be obtained. In particular, combined use of a calcium salt of an organic acid and the above-mentioned organic-acid zinc salt is preferable because it is possible to obtain compositions that are further improved in properties such as heat resistance and stain resistance while having low toxicity.

The amount of organic-acid metal salt used is preferably 0.001 to 10 parts by mass, and more preferably 0.05 to 5 parts by mass, with respect to 100 parts by mass of the vinyl chloride resin.

The vinyl chloride resin composition of the third invention may also contain, as necessary, generally-used additives such as organic phosphite compounds, phenol-based or sulfur-based antioxidants, plasticizers, epoxy compounds, UV absorbers, hindered amine-based light stabilizers, foaming agents, fillers, and polyol compounds.

Examples of the organic phosphite compounds include those compounds given as examples of the organic phosphite compounds used in the chlorine-containing resin composition of the second invention.

Examples of the phenol-based antioxidants include those compounds given as examples of the phenol-based antioxidants used in the chlorine-containing resin composition of the second invention.

Examples of the sulfur-based antioxidants include those compounds given as examples of the sulfur-based antioxidants used in the chlorine-containing resin composition of the second invention.

Examples of the plasticizers include those compounds given as examples of the plasticizers used in the chlorine-containing resin composition of the second invention.

Examples of the epoxy compounds include those compounds given as examples of the epoxy compounds used in the chlorine-containing resin composition of the second invention. Note that in cases of using epoxy compounds that can also be used as plasticizers, such as epoxidized soybean oil, the total amount of epoxy compound and plasticizer used should not exceed 25 parts by mass with respect to 100 parts by mass of the vinyl chloride resin in order to prevent deterioration in rigidity.

Examples of the UV absorbers include those compounds given as examples of the UV absorbers used in the chlorine-containing resin composition of the second invention.

Examples of the hindered amine-based light stabilizers include those compounds given as examples of the hindered amine-based light stabilizers used in the chlorine-containing resin composition of the second invention.

Examples of the foaming agents include those compounds given as examples of the foaming agents used in the chlorine-containing resin composition of the second invention.

Examples of the fillers include those compounds given as examples of the fillers used in the chlorine-containing resin composition of the second invention.

In the vinyl chloride resin composition of the third invention, it is possible to use pentaerythritol and condensates thereof as well as other polyol compounds. Examples of the other polyol compounds include those compounds given as examples of the other polyol compounds used in the chlorine-containing resin composition of the second invention.

Further, other stabilizers may be added to the vinyl chloride resin composition of the third invention. Examples of the other stabilizers include those compounds given as examples of the other stabilizers used in the chlorine-containing resin composition of the second invention.

Furthermore, other additives, such as cross-linking agents, antistatic agents, antifogging agents, anti-plate-out agents, surface-treating agents, slip additives, flame retardants, antifogging agents, fluorescers, fungicides, bactericides, metal deactivators, mold-release agents, pigments, and processing aids, may be mixed as necessary to the vinyl chloride resin composition of the third invention.

The amount of the various additives to use may be selected as appropriate depending on the use, etc. of the vinyl chloride resin composition of the third invention, but the total amount thereof should preferably be 100 parts by mass or less with respect to 100 parts by mass of the vinyl chloride resin.

As with the chlorine-containing resin composition of the second invention, the vinyl chloride resin composition of the third invention can be used without being limited in how it is processed. For example, the vinyl chloride resin composition can suitably be used with calendering, rolling, extrusion, injection molding, melt casting, pressurized molding, and powder molding.

As with the chlorine-containing resin composition of the second invention, the vinyl chloride resin composition of the third invention can suitably be used for various materials such as: construction materials such as wall materials, floor materials, window frames, and wallpapers; interior materials for automobiles; covering materials for electric wires; agricultural materials; food packing materials; coatings; and materials for hoses, pipes, sheets, toys, etc.

EXAMPLES

The structure and effects of the present invention will be described in further detail below through Examples thereof. The present invention, however, is not limited whatsoever to the Examples described below.

Examples 1-1 to 1-3 and Comparative Examples 1-1 to 1-3

The following evaluation was made for the polyol mixtures (stabilizers for chlorine-containing resins) shown in Table 1 below. Note that quantitative compositional analysis of the polyol mixtures was made according to the following procedures using area ratio in gas chromatography.

Compositional Analysis:

Each solution made by adding 2 mg of one of the samples to 0.5 ml of a sililation reagent (product of GL Sciences Inc.; "TMSI-H") was raised in temperature to 80° C. and retained for 15 minutes. After confirming that the solution became transparent, the solution was left to cool to room temperature, and quantitative analysis was made according to the following conditions using area ratio through gas chromatography. The results are shown in Table 1.

Indicating the degree of condensation of pentaerythritol as "n", the retention time for each component in the polyol mixture was n=1 (0.9 min), n=2 (4.5 min), n=3 (7.3 min), and n=4 (9.4 min). Note that quantitation of condensates of pentaerythritol in which the degree of condensation (n) was 5 or above was not possible because of difficulty in distinguishing the peaks in the chart.

Column Conditions:

Capillary column: "ULBON HR-1701" (product of Shinwa Chemical Industries Ltd.; diameter: 0.25 mm; length: 5 m; liquid phase: 7% cyanopropyl, 7% phenylmethyl silicone)

Column temperature: The temperature was raised from 100° C. at a condition of 15° C./min up to 360° C. and retained at 360° C. for 20 minutes.

Solution introduction temperature and detector temperature: 360° C.

Melting Point Measurement:

The melting point of each polyol mixture shown in Table 1 was measured by setting each sample in a melting point measurement device (product of Yanagimoto Mfg. Co., Ltd.; "Type MP-J3") and visually observing the melting behavior of the sample while raising the temperature. Note that the "melting point" is shown as a range from a temperature at which melting behavior started to be observed to a temperature at which melting completed. The results are shown in Table 1 below.

TABLE 1

|  | Polyol Mixture | Compositional Ratio of Polyol Mixture | | | | Melting Point [° C.] |
|---|---|---|---|---|---|---|
|  |  | n = 1 | n = 2 | n = 3 | n ≧ 4 |  |
| Example 1-1 | Mixture 1 | 2.2 | 5.1 | 4.8 | 87.9 | 170-180 |
| Example 1-2 | Mixture 2 | 4.5 | 7.4 | 7.6 | 80.5 | 170-180 |
| Example 1-3 | Mixture 3 | 4.9 | 11.0 | 11.5 | 72.6 | 170-180 |
| Comparative Example 1-1 | Comparative Mixture 1 | 9.3 | 18.0 | 12.7 | 60.0 | 185-190 |
| Comparative Example 1-2 | Comparative Mixture 2 | 10.6 | 36.7 | 21.1 | 31.6 | 195-200 |
| Comparative Example 1-3 | Comparative Mixture 3 | 4.1 | 95.9 | 0 | 0 | 222 |

Examples 2-1 to 2-3 and Comparative Examples 2-1 to 2-5

Using a rocking mill, 1.0 parts by mass of zinc stearate, 0.5 parts by mass of calcium stearate, 0.5 parts by mass of hydrotalcite (product of Kyowa Chemical Industry Co., Ltd.; "ALCAMIZER 1"), 0.2 parts by mass of dibenzoylmethane, 0.2 parts by mass of tetrakis[methylene-3-(3,5-di-tert-butyl-4-hydroxyphenyl)propionate]methane, 1.5 parts by mass of an acrylic polymer processing aid (product of Mitsubishi Rayon Co., Ltd.; "P-551A"), 0.5 parts by mass of a slip additive (phthalic distearate), 0.4 parts by mass of titanium oxide, and 0.5 parts by mass of one of the polyol mixtures shown in Table 1 were mixed to 100 parts by mass of vinyl chloride resin (degree of polymerization: 700), to obtain respective chlorine-containing resin compositions (vinyl chloride resin compositions).

Note that the polyol mixtures shown in Table 1 that were used passed a 60-mesh sieve (mesh size: 250 μm). The following evaluations were made for each of the chlorine-containing resin compositions.

Static Thermal Stability:

Each chlorine-containing resin composition obtained as above was introduced to a rolling machine heated to 190° C. and was subjected to roll-kneading for 3 minutes, to prepare a sheet 0.6 mm thick. The sheet was cooled to room temperature and cut into rectangular test pieces 10 mm wide and 20 mm long.

The rectangular test pieces were placed in a Geer oven heated to 190° C. and were taken out every 15 minutes, to determine the time it took for the pieces to cause heat embrittlement and turn black. The results are shown in Table 2 below.

Charpy Impact Value:

Each chlorine-containing resin composition obtained as above was introduced to a twin-screw extruder and kneaded at an extrusion temperature of 180° C. and a screw rotation speed of 20 rpm. The kneaded resin was immediately shaped into a sheet using a rolling machine. The sheet was pressed to obtain test pieces 4 mm wide, 10 mm thick, and 80 mm long, and the Charpy impact value thereof was evaluated. The results are shown in Table 2 below.

Surface Gloss:

Each chlorine-containing resin composition obtained as above was introduced to a twin-screw extruder and kneaded at an extrusion temperature of 180° C. and a screw rotation speed of 15 rpm. The kneaded resin was immediately shaped using a rolling machine into a sheet 20 mm wide and 4 mm thick. The gloss (Gloss value: 60°) of the surface of the sheet-like product was evaluated. The results are shown in Table 2 below.

Plate-Out:

Each chlorine-containing resin composition obtained as above was introduced to a twin-screw extruder and kneaded at an extrusion temperature of 190° C. and a screw rotation speed of 15 rpm. The kneaded resin was immediately shaped using a rolling machine into a sheet 50 mm wide and 2 mm thick. The sheet was cut to a length of 20 cm, and the number of crater-like plate-outs on the surface (one side) of the sheet was counted. The results are shown in Table 2 below.

TABLE 2

| | Polyol Mixture | Composition of Polyol Mixture [% by mass] | | Static Thermal Stability [min] | Charpy Impact Value [kJ/m$^2$] | Surface Gloss (60° Gloss) | Plate-Out [number/ 100 cm$^2$] |
|---|---|---|---|---|---|---|---|
| | | n = 1 | n = 1-3 | | | | |
| Example 2-1 | Mixture 1 | 2.2 | 13.1 | 120 | 18.8 | 65 | 3 |
| Example 2-2 | Mixture 2 | 4.5 | 19.5 | 120 | 18.5 | 66 | 3 |
| Example 2-3 | Mixture 3 | 4.9 | 27.4 | 120 | 18.2 | 62 | 4 |
| Comparative Example 2-1 | Control[(1)] | 0 | 0 | 15 | 19.7 | 67 | 3 |
| Comparative Example 2-2 | Comparative Mixture 1 | 9.3 | 40.0 | 120 | 15.7 | 53 | 43 |
| Comparative Example 2-3 | Comparative Mixture 2 | 10.6 | 61.4 | 120 | 14.8 | 52 | 40 |
| Comparative Example 2-4 | Comparative Mixture 3 | 4.1 | 95.9 | 90 | 9.1 | 42 | 620 |
| Comparative Example 2-5 | Comparative Mixture 4[(2)] | 4.1 | 95.9 | 90 | 15.5 | 51 | 4 |

[(1)]Containing no polyol mixture
[(2)]Comparative Mixture 3 that has passed a 300-mesh sieve (mesh size: 45 μm)

Example 3-1 and Comparative Examples 3-1 and 3-2

Using a rocking mill, 1.0 parts by mass of zinc stearate, 0.5 parts by mass of calcium stearate, 0.5 parts by mass of hydrotalcite (product of Kyowa Chemical Industry Co., Ltd.; "ALCAMIZER 1"), 0.2 parts by mass of dibenzoylmethane, 0.2 parts by mass of tetrakis[methylene-3-(3,5-di-tert-butyl-4-hydroxyphenyl)propionate]methane, 50 parts by mass of dioctyl phthalate, 2 parts by mass of epoxidized soybean oil, and 0.5 parts by mass of one of the polyol mixtures shown in Table 3 were mixed to 100 parts by mass of vinyl chloride resin (degree of polymerization: 1000), to obtain respective chlorine-containing resin compositions (vinyl chloride resin compositions). Each chlorine-containing resin composition obtained as above was introduced to a rolling machine heated to 170° C. and was subjected to roll-kneading for 5 minutes, to prepare a sheet 0.7 mm thick. The sheet was cooled to room temperature and cut into pieces of an appropriate size. Two of the sheet-like pieces were place on top of one another and were pressed for 5 minutes at 180° C. under a load of 30 kg/cm$^2$. The pressed sheet was 1 mm thick. The following evaluations were made thereon.

Haze:

The haze value of each sheet mentioned above was determined using "Haze-gard II" (product of Toyo Seiki Seisaku-sho, Ltd.). The results are shown in Table 3 below.

Tensile Test:

Test pieces for the tensile test were created using the above-mentioned sheets. The tensile strength, tensile breaking strength, and elongation percentage were determined using a tensile testing machine (product of Toyo Seiki Seisaku-sho, Ltd.; "Strograph AII"). The results are shown in Table 3 below.

TABLE 3

| | Polyol Mixture | Haze [%] | Tensile Strength [MPa] | Tensile Breaking Strength [MPa] | Elongation Percentage [%] |
|---|---|---|---|---|---|
| Example 3-1 | Mixture 2 | 30.6 | 10.2 | 20.7 | 340 |
| Comparative Example 3-1 | Comparative Mixture 1 | 40.2 | 10.1 | 20.3 | 332 |
| Comparative Example 3-2 | Comparative Mixture 4 | 49.5 | 10.1 | 20.1 | 329 |

Table 1 provided above shows that the stabilizer for chlorine-containing resins of the present invention has a low melting point, and it was confirmed that the melting point thereof was lower than the molding/processing temperatures (180 to 190° C.) of the vinyl chloride resin composition. (See Examples 1-1 to 1-3.)

Table 2 provided above shows that the chlorine-containing resin composition (vinyl chloride resin composition) not containing a polyol mixture (Comparative Example 2-1) and chlorine-containing resin compositions (vinyl chloride resin compositions) containing, as stabilizers, polyol mixtures having compositions different from the composition of the chlorine-containing-resin stabilizer of the present invention (Comparative Examples 2-2 to 2-5) have poor heat resistance, Charpy impact values, and product outer appearance. Further, Table 3 provided above shows that the transparency of the products (Comparative Examples 3-1 and 3-2) is also not satisfying.

In contrast, Table 2 confirms that the chlorine-containing resin compositions (vinyl chloride resin compositions) according to the present invention (Examples 2-1 to 2-3)

using polyol mixtures containing pentaerythritol and condensates thereof at a specific rate are excellent in heat resistance, physical properties, and product outer appearance.

Further, Table 3 confirms that, even though the chlorine-containing resin composition (vinyl chloride resin composition) according to the present invention (Example 3-1) uses a polyol mixture having passed a 60-mesh sieve (mesh size: 250 μm), it has physical properties comparable to or better than the chlorine-containing resin composition (vinyl chloride resin composition) (Comparative Example 3-2) that uses dipentaerythritol having passed a 300-mesh sieve (mesh size: 45 μm) and is also superior thereto in transparency.

Industrial Applicability

According to the present invention, it is possible to provide a vinyl chloride resin composition that has excellent heat resistance, transparency, and outer appearance by adding, to a chlorine-containing resin, a polyol mixture containing pentaerythritol and condensates thereof at a specific rate as a stabilizer.

Further, according to the present invention, it is possible to provide a vinyl chloride resin composition that has excellent heat resistance, transparency, and outer appearance by adding, to a vinyl chloride resin containing a calcium/zinc-based stabilizer, a polyol mixture containing pentaerythritol and condensates thereof at a specific rate as an additional stabilizer.

The invention claimed is:

1. A stabilizer for chlorine-containing resins, comprising a polyol mixture of pentaerythritol and condensates thereof,
    wherein, with respect to a total amount of the polyol mixture,
    a content of pentaerythritol having a degree of condensation (n) of 1 is 0% to 10% by mass,
    a total content of pentaerythritol and condensates thereof having a degree of condensation (n) of 1 to 3 is 5% to 30% by mass, and
    a content of the pentaerythritol condensates having a degree of condensation (n)≧4 is 70% to 95% by mass.

2. A chlorine-containing resin composition comprising, with respect to 100 parts by mass of the chlorine-containing resin, 0.01 to 10 parts by mass of the stabilizer for chlorine-containing resins according to claim 1.

3. A vinyl chloride resin composition comprising, with respect to 100 parts by mass of the vinyl chloride resin,
    0.1 to 20 parts by mass of a calcium/zinc-based stabilizer, and
    0.01 to 10 parts by mass of a polyol compound,
    wherein, the polyol compound is a polyol mixture comprising pentaerythritol and condensates thereof, and, with respect to a total amount of the polyol mixture, the total content of pentaerythritol and condensates thereof having a degree of condensation (n) of 1 to 3 is 5% to 40% by mass.

4. The vinyl chloride resin composition according to claim 3, wherein the content of pentaerythritol having a degree of condensation (n) of 1 is 0% to 10% by mass and the total content of pentaerythritol and condensates thereof having a degree of condensation (n) of 1 to 3 is 5% to 30% by mass.

5. The stabilizer according to claim 1, wherein the sum of the content of pentaerythritol and condensates thereof having a degree of condensation (n) of 1 to 3 and the content of condensates of pentaerythritol having a degree of condensation (n) of 4 or above is 100% by mass.

6. The stabilizer according to claim 1, wherein:
    the content of pentaerythritol having a degree of condensation (n) of 1 is 0% to 5% by mass, and the total content of pentaerythritol and condensates thereof having a degree of condensation (n) of 1 to 3 is 5% to 30% by mass.

7. The stabilizer according to claim 1, wherein the pentaerythritol condensates is a compound of general formula (1):

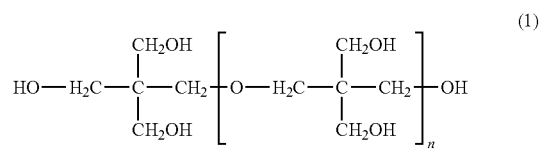

wherein "n" is an integer ≧0.

8. The chlorine-containing resin composition according to claim 2, wherein the chlorine-containing resin is selected from the group consisting of: polyvinyl chloride, chlorinated polyvinyl chloride, polyvinylidene chloride, chlorinated polyethylene, vinyl chloride-vinyl acetate copolymer, vinyl chloride-ethylene copolymer, vinyl chloride-propylene copolymer, vinyl chloride-styrene copolymer, vinyl chloride-isobutylene copolymer, vinyl chloride-vinylidene chloride copolymer, vinyl chloride-styrene-maleic anhydride terpolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate terpolymer, vinyl chloride-maleate copolymer, vinyl chloride-methacrylate copolymer, vinyl chloride-acrylonitrile copolymer, copolymers of vinyl chloride and vinyl ethers, and mixtures thereof.

9. The chlorine-containing resin composition according to claim 2, further comprising 0.001 parts to 10 parts by mass of a β-diketone compound, with respect to 100 parts by mass of the chlorine-containing resin, the β-diketone compound selected from the group consisting of: acetylacetone, triacetylmethane, 2,4,6-heptatrione, butanoylacetylmethane, lauroylacetylmethane, palmitoylacetylmethane, stearoylbenzoylmethane, stearoylacetylmethane, phenylacetylacetylmethane, dicyclohexylcarbonylmethane, benzoylformylmethane, benzoylacetylmethane, dibenzoylmethane, octylbenzoylmethane, bis(4-octylbenzoyl)methane, benzoyldiacetylmethane, 4-methoxybenzoylbenzoylmethane, bis(4-arboxymethylbenzoyl)methane, 2-carboxymethylbenzoylacetyloctylmethane, dehydroacetic acid, ethyl acetoacetate, cyclohexan-1,3-dione, 3,6-dimethyl-2,4-dioxycyclohexane-1-carboxylic acid methyl ester, 2-acetylcyclohexanone, dimedone, 2-benzoylcyclohexane, and metal salts thereof.

10. The chlorine-containing resin composition according to claim 2, further comprising 0.001 parts to 10 parts by mass of a hydrotalcite compound, with respect to 100 parts by mass of the chlorine-containing resin.

11. The chlorine-containing resin composition according to claim 2, further comprising 0.001 parts to 10 parts by mass of a metal salt of an organic acid, with respect to 100 parts by mass of the chlorine-containing resin.

12. The chlorine-containing resin composition according to claim 11, wherein the metal salt is a zinc salt.

13. The chlorine-containing resin composition according to claim 2, further comprising one or more additive selected from the group consisting of: as organic phosphate compounds, phenol-based or sulfur-based antioxidants, plasticizers, epoxy compounds, UV absorbers, hindered amine-based light stabilizers, foaming agents, fillers, and polyol compounds.

14. The vinyl chloride resin composition according to claim 3, comprising 0.1 to 3 parts by mass of the polyol compound.

15. The vinyl chloride resin composition according to claim 3, comprising 1 to 7 parts by mass of the calcium/zinc-based stabilizer.

16. The vinyl chloride resin composition according to claim 3, further comprising 0.001 parts to 10 parts by mass of a β-diketone compound, with respect to 100 parts by mass of the chlorine-containing resin, the β-diketone compound selected from the group consisting of: acetylacetone, triacetylmethane, 2,4,6-heptatrione, butanoylacetylmethane, lauroylacetylmethane, palmitoylacetylmethane, stearoylbenzoylmethane, stearoylacetylmethane, phenylacetylacetylmethane, dicyclohexylcarbonylmethane, benzoylformylmethane, benzoylacetylmethane, dibenzoylmethane, octylbenzoylmethane, bis(4-octylbenzoyl)methane, benzoyldiacetylmethane, 4-methoxybenzoylbenzoylmethane, bis(4-carboxymethylbenzoyl)methane, 2-carboxymethylbenzoylacetyloctylmethane, dehydroacetic acid, ethyl acetoacetate, cyclohexan-1,3-dione, 3,6-dimethyl-2,4-dioxycyclohexane-1-carboxylic acid methyl ester, 2- acetylcyclohexanone, dimedone, 2-benzoylcyclohexane, and metal salts thereof.

17. The vinyl chloride resin composition according to claim 3, further comprising 0.001 parts to 10 parts by mass of a hydrotalcite compound, with respect to 100 parts by mass of the chlorine-containing resin.

18. The vinyl chloride resin composition according to claim 3, further comprising 0.001 parts to 10 parts by mass of a metal salt of an organic acid, with respect to 100 parts by mass of the chlorine-containing resin.

19. The vinyl chloride resin composition according to claim 18, wherein the metal salt is a zinc salt.

20. The chlorine-containing resin composition according to claim 3, further comprising one or more additive selected from the group consisting of: as organic phosphate compounds, phenol-based or sulfur-based antioxidants, plasticizers, epoxy compounds, UV absorbers, hindered amine-based light stabilizers, foaming agents, fillers, and polyol compounds.

* * * * *